United States Patent [19]

Wittlinger et al.

[11] 4,294,321
[45] Oct. 13, 1981

[54] POSITION SENSING AND DISPLAY MEANS
[75] Inventors: Harold A. Wittlinger, Pennington; Carmine P. Salerno, Avenel, both of N.J.
[73] Assignee: RCA Corporation, New York, N.Y.
[21] Appl. No.: 125,118
[22] Filed: Feb. 27, 1980
[51] Int. Cl.³ .................. G01G 3/14; G01R 27/26; H01G 7/00
[52] U.S. Cl. .................. 177/210 FP; 177/210 C; 324/61 R; 361/283
[58] Field of Search .................. 177/210 FP, 210 EM, 177/210 C; 361/278, 283, 290; 324/61 R

[56] References Cited
U.S. PATENT DOCUMENTS 2,756,286  7/1956  Johnson et al. .................. 361/290 X
3,680,650  8/1972  Zimmerer .................. 177/210 C
3,786,884  1/1974  Allenspach .................. 177/210 FP X
4,243,114  1/1981  Brouwer .................. 361/283 X Primary Examiner—George H. Miller, Jr.
Attorney, Agent, or Firm—Samuel Cohen; Henry I. Schanzer

[57] ABSTRACT

A position sensing and display means for use on a weighing scale includes two stationary spaced conductive plates to which out-of-phase oscillations are supplied. A movable conductive plate has a position between the two stationary plates dependent on the weight of an object being measured. The amplitude of the oscillations capacitively coupled to the movable conductive plate is displayed as an indication of the weight of the object.

11 Claims, 5 Drawing Figures

POSITION SENSING AND DISPLAY MEANS

This invention relates to a position sensing and display means which is particularly useful in weighing apparatus for sensing how much a mechanical part in the weighing apparatus is displaced by the weight of an object being measured.

In accordance with an example of the invention, two stationary spaced conductive members are supplied with opposite phases of an electronic oscillation. A movable conductive member has a position between the two stationary members dependent on the magnitude of a physical characteristic of an object being measured. A peak-to-peak detector receptive to the electronic oscillations coupled from the two stationary conductive members to the movable conductive member provides an output signal in accordance with the magnitude of the characteristic, such as weight, of the object being measured.

Figure 1:
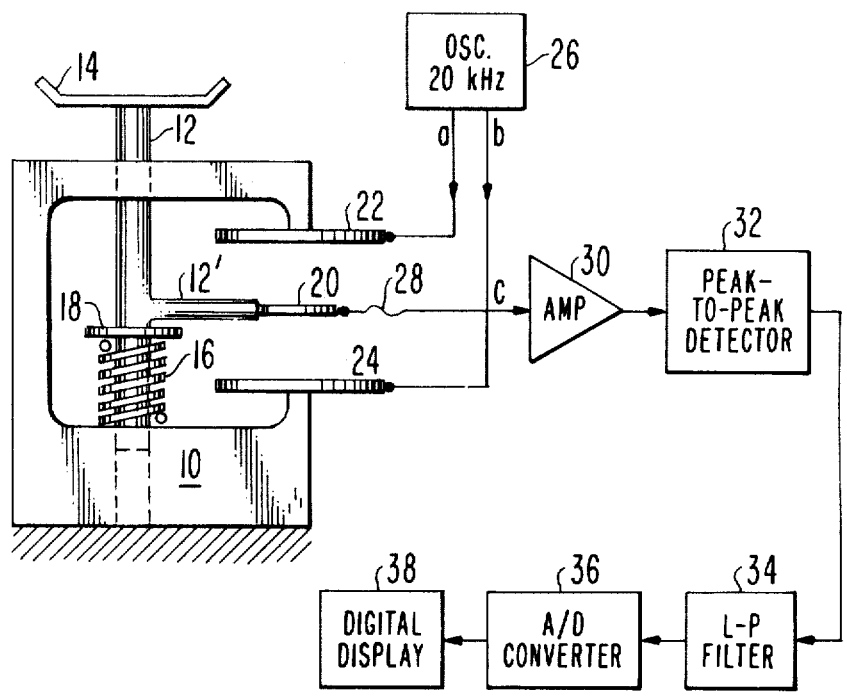
FIG. 1 is a schematic block diagram of a position sensing and display means according to the invention.

Referring now in greater detail to FIG. 1, a scale for weighing objects includes a base 10 and a rod 12 supporting a tray 14 for the object to be weighed. The rod 12 is supported by the base 10 for vertical movement downwardly to compress a spring 16 between the base 10 and a flange 18 on the rod 12. The amount of downward displacement of the rod 12 is a measure of the weight of the object placed in tray 14. The rod 12 has an extension 12' supporting a conductive plate or disk 20 between stationary conductive plates or disks 22 and 24 which are supported by base 10. All members supporting and close to the plates 20, 22 and 24 are formed of electrically insulating material so as not to interfere with or distort the electrostatic or capacitive coupling from stationary plates 22 and 24 to the movable plate 20. The movable plate 20 is seen to be moved from the position shown towards the stationary plate 24 when an object to be weighed is placed on the tray 14. The greater the weight of the object, the further plate 20 is from plate 22 and the closer it is to plate 24.

Figure 2:
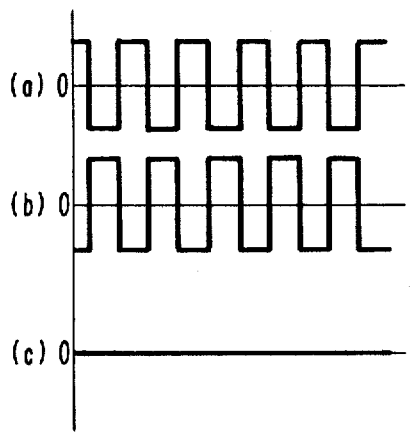
FIGS. 2 and 3 are charts of voltage waveforms which will be referred to in describing the operation of the apparatus of FIG. 1.

An electronic oscillator, which, by way of example, may operate at a frequency of about 20,000 Hertz, has two out-of-phase outputs a and b, as shown in FIG. 2, connected to respective ones of stationary conductive plates 22 and 24. The movable conductive plate 20 is connected by a flexible wire 28 to the input of an amplifier 30. The 20 KHz oscillation amplified in amplifier 30 is applied to a peak-to-peak detector 32 which produces a d-c voltage proportional to the peak-to-peak voltage of the a-c signal from the amplifier. The peak-to-peak voltage signal is passed through a low-pass filter 34 to an analog-to-digital converter 36 which translates the peak-to-peak analog voltage to a corresponding digital signal. The digital signal is applied to a display unit 38 which visually displays a corresponding digital number. A zero adjust means (not shown) may be included to insure a zero output when there is no object to be weighed on tray 14.

In the operation of the apparatus shown in FIG. 1, before an object to be weighed is placed on the tray 14. For purpose of this explanation, the movable conductive plate 20 can be considered to be initially located equidistant from stationary plates 22 and 24. Consequently, equal amplitudes of the out-of-phase oscillations from oscillator 26 are capacitively coupled to movable plate 20, as shown by waveforms (a) and (b) in FIG. 2. The equal and out-of-phase oscillations cancel each other, leaving a zero voltage, as shown in FIG. 2(c). In the absence of a signal to the electronic circuits 30 through 36, a zero weight is displayed by display unit 38. (As will be described in connection with FIG. 4, the element 20 initially may be closer to 22 than to 24 and the wave a of sufficiently lower amplitude than the wave b to obtain total cancellation at 20, that is, to induce a net voltage of zero at c when no object is present on the pan 14).

When an object to be weighed is placed on tray 14, the rod 12 compresses the spring 16, and movable conductive plate 20 moves downwardly to a position determined by the weight of the object. Since the plate 20 is further from stationary plate 22, a smaller amplitude of oscillation is coupled from plate 22 to plate 20, as shown by FIG. 3(a). And a larger amplitude of oscillation is coupled from plate 24 to plate 20, as shown by FIG. 3(b). Since the oscillations coupled to plate 20 from the two sources are out-of-phase, the smaller oscillation cancels part of the larger oscillation and leaves a difference oscillation, as shown by FIG. 3(c), on the movable plate 20. This net oscillation, after amplification at 30, is applied to peak-to-peak detector 32 which produces an analog voltage proportional to the peak-to-peak value, shown at 40 in FIG. 3(c), of the oscillation. The analog voltage signal is then filtered at 34, converted to a digital signal at 36 and displayed as a digital number, at 38, which represents the weight in pounds or kilograms of the object in tray 14.

Figure 4:
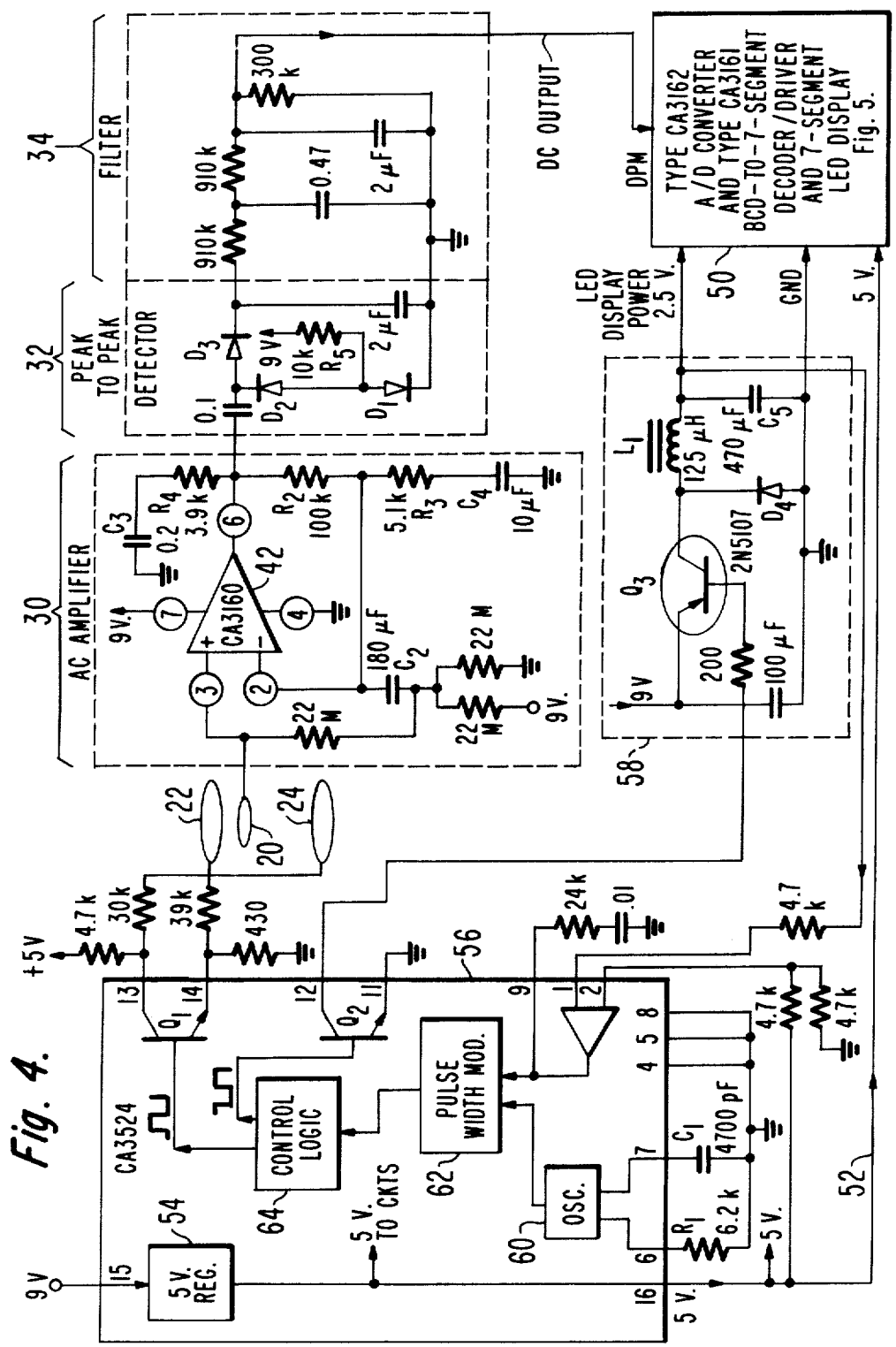
FIG. 4 is a more detailed diagram of the apparatus shown in FIG. 1.

Reference is now made to FIG. 4 for a description of a specific implementation of the electronic system shown in FIG. 1. The movable conductive plate 20 is connected to the input of an a-c amplifier 30 including an operational amplifier 42 connected with external circuit elements as shown. The circuit has the extremely high input impedance essential for accurate amplification of the signal coupled to plate 20. Capacitor $C_2$ effectively "bootstraps" the input a-c input capacitance to further improve the input impedance. The a-c gain of the amplifier is set by the basic resistor ratio $R_2/R_3 + 1$. Elements $R_4$ and $C_3$ at the amplifier output reduce its rather high output impedance, thus contributing to its stability. Capacitor $C_4$ insures that the d-c gain of the amplifier is unity, thus maintaining a centered output during the no-signal condition. The amplifier 42 may be a Type CA3160 BiMOS operational amplifier made by RCA Corporation.

The output of the amplifier 30, which in the example is an oscillation of about 5 volts peak-to-peak maximum, is coupled to a conventional peak-to-peak detector 32 including diodes $D_2$ and $D_3$. Diode $D_1$ provides a one-diode-drop potential via resistor $R_5$. This effectively reduces the initial threshold drop of diode $D_3$ in the circuit.

Figure 5:
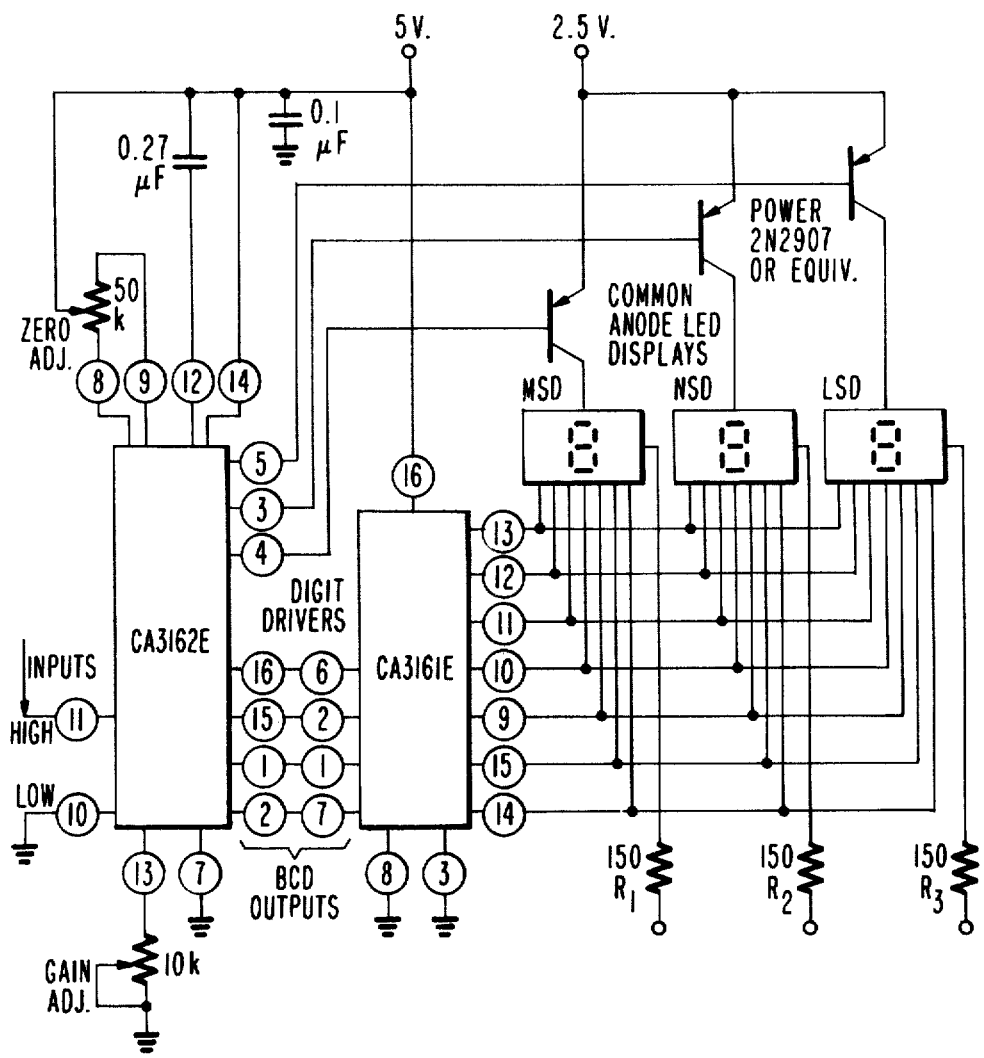
FIG. 5 is a detailed diagram of the elements in a block 50 in FIG. 4.

The output of the peak-to-peak detector 32 is filtered and attenuated in low-pass filter 34 so that the filtered output is a d-c voltage of about 0.3 volts, maximum. The filter smooths the voltage changes before the voltage is applied to the fast-acting analog-to-digital converter in the digital Panel Meter 50. The Digital Panel Meter 50 includes a Type CA3162 A/D converter, receptive to the output of filter 34, and having an output coupled through a Type CA3161 BCD-to-Seven-Segment Decoder/Driver to a Seven-Segment Common-Anode LED Display, all as shown in FIG. 5.

The Digital Panel Meter 50 requires a 5-volt supply which is supplied over line 52 from a 5-volt regulator 54 in a Type CA3524 Switching Regulator 56 made by RCA Corporation, or a Type SG3524 Regulating Pulse Width Modulator made by Silicon General. The Light-Emitting-Diode display in the Digital Panel Meter 50 requires a 2.5 volt supply which is economically provided by a 9-volt switching and filtering circuit 58 receptive to variable-width control pulses from an oscillator 60 in the Switching Regulator 56 via a pulse-width modulator 62, the control logic 64 and a transistor $Q_2$.

The main purpose of the oscillator 60 is to supply out-of-phase oscillations to the two respective stationary plates 22 and 24. The frequency of the oscillator 60 is determined by the values of resistor $R_1$ and Capacitor $C_1$ connected thereto. The oscillator output is supplied through pulse-width modulator 62, control logic 64 and a transistor $Q_1$ to the plates 22 and 24. The ratio of the amplitudes of the two out-of-phase oscillations are controlled by the 4.7K resistor connected to the collector of transistor $Q_1$ and the 430-ohm resistor connected to the emitter so that a larger amplitude of oscillations is applied to member 24 than to member 22. The movable member 20 is positioned correspondingly closer to the member 22, so that equal-amplitude oscillations are received by member 20 in the zero-weight condition of the scale. The member 20 then has a greater distance to travel before interference with member 24. The total amplitude of the out-of-phase oscillations is determined by the regulated 5-volt supply input and the resistor ratio, since $Q_1$ is allowed to saturate. Two output series resistors of 30K and 39K reduce the amplitude of high-frequency components coupled to plates 22 and 24.

Figure 3:
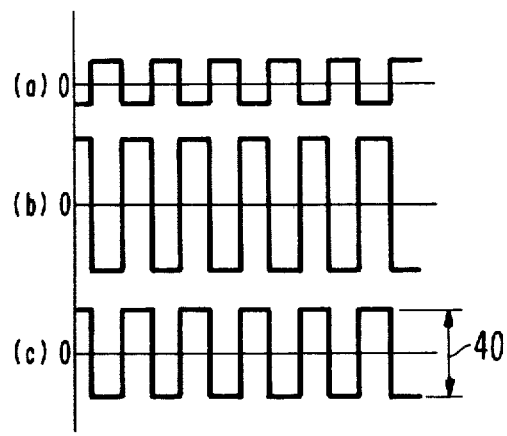

The operation of the detailed circuit of FIG. 4 is the same as has been described in connection with the block diagram of FIG. 1. However, the out-of-phase oscillations supplied from oscillator 60 through the pulse-width modulator 62 and transistor $Q_1$ are not as symmetrical as illustrated in FIGS. 2 and 3. It is because of this lack of symmetry in a changing amount that a peak-to-peak detector 32 be employed instead of an average or root-mean-square detector.

While the invention has been described in terms of a scale, it is also applicable to the measurement of position as might be used, for example, to determine the level of a fluid in a tank, or the position of a valve, or the condition of a pressure transducer, to name a few examples.

What is claimed is:

1. The combination comprising:
two stationary spaced conductive members;
an electronic oscillator supplying an oscillation of one phase to one of said two members and an oscillation of the opposite phase to the other of the two members;
a movable conductive member having a position between said two stationary members dependent on the magnitude of a physical characteristic being measured; and
an amplitude detector means having an input directly connected to said movable conductive member and producing an output in accordance with the difference in the amplitudes of the oscillations of opposite phases coupled from the two stationary members to the one movable member.

2. The combination of claim 1 wherein said movable member is initially positioned equidistant from said two stationary members, and equal amplitudes of oscillations are supplied to said two stationary members, so that equal amplitudes of oscillations are coupled to said movable member.

3. The combination of claim 1 wherein said movable member is initially positioned closer to one of said two stationary members than the other, and a lesser amplitude of oscillations is supplied to the closer one of the two stationary members, so that equal amplitudes of oscillations are coupled to said movable member.

4. The combination as claimed in claim 1 wherein said amplitude detector means includes a peak-to-peak detector.

5. The combination as claimed in claim 4, wherein said amplitude detector means includes means to translate the output of said peak-to-peak detector to an indication of the magnitude of the physical characteristic being measured.

6. The combination as claimed in claim 4, wherein said amplitude detector means includes an analog-to-digital converter responsive to the output of said peak-to-peak detector.

7. The combination as claimed in claim 6, wherein said amplitude detector means includes a digital display responsive to the output of said analog-to-digital converter.

8. The combination comprising:
two stationary spaced conductive members;
a movable conductive member having a position between said two stationary members dependent on the magnitude of a physical characteristic being measured;
means for applying a potential between said two stationary members for inducing a signal onto said movable member which is a function of the distance of said movable member from either one of said two stationary members; and
a signal responsive means having an input directly connected to said movable conductive member for sensing the value of the signal on said movable member and for producing an output signal indicative of the distance of said movable member from either one of said two stationary members.

9. The combination as claimed in claim 8 wherein said means for applying a potential between said two stationary members includes an electronic oscillator for supplying an oscillation of one phase to one of said two members and an oscillation of the opposite phase to the other of the two members.

10. The combination as claimed in claim 8 wherein said input of said signal responsive means is connected via a flexible wire to said movable conductive member.

11. The combination as claimed in claim 8 wherein said signal responsive means includes a high input impedance amplifier connected at its input to said movable conductive member.

* * * * *